(12) United States Patent
Rohr (10) Patent No.: US 12,024,017 B2
(45) Date of Patent: Jul. 2, 2024

(54) SELECTION CONTROLLER FOR AN AUDIO CONTROL DEVICE, AUDIO CONTROL DEVICE AND VEHICLE

(71) Applicant: Bayerische Motoren Werke Aktiengesellschaft, Munich (DE)

(72) Inventor: Jakob Rohr, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/595,792

(22) PCT Filed: Mar. 27, 2020

(86) PCT No.: PCT/EP2020/058640
§ 371 (c)(1),
(2) Date: Nov. 24, 2021

(87) PCT Pub. No.: WO2020/239290
PCT Pub. Date: Dec. 3, 2020

(65) Prior Publication Data
US 2022/0305916 A1    Sep. 29, 2022

(30) Foreign Application Priority Data
May 27, 2019 (DE) .................. 10 2019 114 111.7

(51) Int. Cl.
*B60K 35/10* (2024.01)
*G05G 1/08* (2006.01)
*G05G 1/10* (2006.01)

(52) U.S. Cl.
CPC ............. *B60K 35/10* (2024.01); *G05G 1/087* (2013.01); *G05G 1/10* (2013.01); *G05G 1/105* (2013.01);
(Continued)

(58) Field of Classification Search
CPC ...... H01H 2003/085; H01H 3/08; G05G 1/10; G05G 1/087; B60K 37/06; B60K 2370/128; B60K 2370/345; B60K 2370/146
See application file for complete search history.

(56) References Cited

U.S. PATENT DOCUMENTS 3,557,637 A * 1/1971 Tomczak ............... G05G 1/087
74/504
7,564,150 B2 * 7/2009 Baier ..................... F24C 7/083
307/115
(Continued)

FOREIGN PATENT DOCUMENTS

CN         1774871 A      5/2006
CN       104442820 A      3/2015
(Continued)

OTHER PUBLICATIONS

Machine translation of DE102007035564A1, obtained from fit database (Year: 2009).*
(Continued)

*Primary Examiner* — Thomas C Diaz
(74) *Attorney, Agent, or Firm* — Crowell & Moring LLP (57) ABSTRACT

A selection controller for manual selection of an operating mode and/or operating characteristics of an audio control device is disposed within an interior of a vehicle. The selection controller includes a selector element that is designed to allow a user to make the manual selection. The selecting element can be arranged at least in a first position that is not elevated from a control surface of the audio control device and in a second position that is elevated from the control surface of the audio control device.

17 Claims, 8 Drawing Sheets

(52) U.S. Cl.
CPC .. *B60K 2360/128* (2024.01); *B60K 2360/146* (2024.01); *B60K 2360/345* (2024.01)

(56) References Cited

U.S. PATENT DOCUMENTS

| | | | |
|---|---|---|---|
| 9,477,329 B1 * | 10/2016 | Ding | G06F 3/0362 |
| 10,596,908 B1 * | 3/2020 | Baek | B60K 37/06 |
| 2002/0133276 A1 | 9/2002 | Onodera | |
| 2005/0047612 A1 * | 3/2005 | Shimada | G05G 1/087 381/104 |
| 2014/0257567 A1 | 9/2014 | Jolda et al. | |
| 2017/0334340 A1 | 11/2017 | Madril et al. | |

FOREIGN PATENT DOCUMENTS

| | | | | |
|---|---|---|---|---|
| CN | 109689432 A | | 4/2019 | |
| DE | 196 45 675 A1 | | 5/1998 | |
| DE | 199 36 257 A1 | | 2/2001 | |
| DE | 102005018380 A1 * | | 11/2006 | B60K 37/06 |
| DE | 10 2007 035 564 A1 | | 1/2009 | |
| DE | 102007035564 A1 * | | 1/2009 | G05G 1/105 |
| DE | 102012002303 A1 * | | 8/2013 | B60K 26/02 |
| DE | 10 2018 103 350 A1 | | 8/2019 | |
| EP | 1 628 047 A1 | | 2/2006 | |
| GB | 2253898 A * | | 9/1992 | G05G 1/087 |
| WO | WO 2009/015733 A1 | | 2/2009 | |

OTHER PUBLICATIONS

Machine translation of DE 102012002303 A1, obtained from Fit database (Year: 2013).*

Machine translation of DE 102005018380 A1, obtained from FIT database (Year: 2006).*

English translation of Chinese-language Office Action issued in Chinese Application No. 202080035439.1 dated Aug. 3, 2022 (seven (7) pages).

International Search Report (PCT/ISA/210) issued in PCT Application No. PCT/EP2020/058640 dated Jul. 24, 2020 with English translation (six (6) pages).

German-language Written Opinion (PCT/ISA/237) issued in PCT Application No. PCT/EP2020/058640 dated Jul. 24, 2020 (six (6) pages).

German-language Search Report issued in German Application No. 10 2019 114 111.7 dated Feb. 17, 2020 with partial English translation (10 pages).

* cited by examiner

SELECTION CONTROLLER FOR AN AUDIO CONTROL DEVICE, AUDIO CONTROL DEVICE AND VEHICLE

BACKGROUND AND SUMMARY OF THE INVENTION

The present subject matter relates to a selection controller for an audio control device, in particular in the interior of a vehicle, to an audio control device for the interior of a vehicle as such and to a vehicle, a motor vehicle, or a passenger vehicle.

Modern concepts for the configuration of the interior of a vehicle require technical devices in the vehicle interior to have a design that does without visible switches and instead relies on touch-sensitive elements—for example touch panels, touch sliders and the like.

Operating such devices is comparatively complex, however, because visual attention by the operator is required in order to accomplish the applicable manual actions.

The present subject matter is based on the object of improving convenience and reliability when operating audio control devices by way of selection controllers, without losses of visual aesthetics.

The object on which the present subject matter is based is achieved for a selection controller, for an audio control device for the interior of a vehicle, and for a vehicle. Advantageous developments are the subject of the respective dependent claims.

A first aspect of the present subject matter provides a selection controller for manual selection of or for manually selecting at least one type of operation and/or one operating property of an audio control device, in particular in the interior of a vehicle, which selection controller is produced with a selecting element, the selecting element being designed for manual operation for the selection and so as to be able to be arranged, or so as to be arranged, at least in a first position I, which is not raised from a surface or control surface of the underlying audio control device, and in a second position II, which is raised from the control surface. The effect achieved by these measures is that the overall aesthetic impression of the control surface of the underlying audio control device can remain undisturbed in the first position and the selecting element is raised from the control surface of the underlying audio control device only in the second position, in order to allow appropriate operation by a user.

In principle, all mechanisms that allow the unraised first position I and the raised second position II in regard to the control surface to be realized for the selecting element can be used for the selection controller according to the present subject matter.

It is of particular advantage in this regard if, according to an example embodiment of the selection controller according to the present subject matter, the selecting element is produced or designed so as to be automatically, controllably and/or selectively able to be kept in the first position I and in the second position II.

Additionally or alternatively, the selecting element may be produced or designed so as to be able to be mechanically moved between the first position I and the second position II.

To realize the last-mentioned embodiment, the selection controller according to the present subject matter has, according to a preferred development, a moving device or a connection to a moving device, the moving device being designed to move the selecting element from the first position I to the second position II and/or from the second position II to the first position I.

Such a movement can advantageously take place in each case automatically, selectively and/or in a controllable manner, the moving device being designed accordingly and/or having suitably fashioned means for such a movement.

Precisely arranged guide grooves allow segments and segment bodies to be driven from position I to position II, and vice versa, in a specific displacement rhythm. Furthermore, this achieves decoupling that enables the selection controller to be used. This displacement rhythm can therefore enable the audio control device to be used quickly and intuitively, so as to allow no obstructions to arise for the user in the course of this.

The motor can achieve a precise speed, in order to ensure that the segments are shifted in a specific period of time.

The selecting element can be in an active or activated state fundamentally and regardless of the first and second positions I and II, which means that a selection can be made by the user or operator by way of the selecting element regardless of positions I and II.

In a preferred embodiment of the selection controller according to the present subject matter, however, the first position I of the selecting element is associated with a first operating state, and/or an operating state that is inactive for selection by means of the selecting element, of the selecting element and/or the second position II of the selecting element is associated with a second operating state, and/or an operating state that is active for selection by means of the selecting element, of the selecting element.

In advantageous developments of the selection controller according to the present subject matter, the state of the selection controller, in particular of the selecting element, in respect of the first and second position is made dependent on various operating states of the underlying vehicle and/or the audio control device.

It is of particular advantage in this regard if, according to another advantageous configuration of the selection controller according to the present subject matter, said selection controller is produced with an electronic control unit or a connection to an electronic control unit.

The electronic control unit may be suitably designed to perform or carry out, initiate, control and/or regulate an arrangement or the arranging of the selecting element in the first position I and/or in the second position II, movement from the first position I to the second position II and/or movement from the second position II to the first position I and in particular operation of a or the moving device.

In order to be able to determine states of the vehicle, of the audio control device and/or a user requirement or operator requirement, another preferred example embodiment of the selection controller according to the present subject matter has a sensor or a connection to a sensor, the sensor being designed to detect the presence of and/or a gesture by a user and/or an approach by the user and in particular by a hand of the user in regard to the underlying audio control device and/or the selecting element.

Accordingly detected data in regard to the presence, the gesture and/or the approach can be signalled to the underlying electronic control unit, the electronic control unit then being able to take or instigate appropriate measures after an assessment.

The selection controller may be designed to put the selecting element into the second position II, or to at least temporarily keep it in the second position II, in the event of an approach and/or in the event of the presence of a predefined gesture.

Various configurations of the selection controller and in particular of the respective selecting element can be considered in respect of ergonomic and/or design aspects. The freedom of selection for the different materials in the motor vehicle can also play a special part in this regard.

As such, according to another advantageous development of the selection controller according to the present subject matter, the selecting element may be wholly or partly in segmented form.

In this regard, for example an outer part of the selecting element may be produced with a plurality of segments that are individually, simultaneously, successively and/or coordinately movable between the first and second positions.

In principle, all geometric configurations for the segments as a whole are conceivable in respect of ergonomics and/or design.

However, it is of particular advantage if the segments as a whole substantially form a hollow cylindrical shape or, in cross section, an annular shape.

Additionally or alternatively, the selecting element or a part thereof may be at least partly in optically and/or visually transparent form.

This measure can be used to have light shone through the respective transparent part rearward or in retrograde fashion from a rear that is remote from the interior of the underlying vehicle by means of a lighting device or by means of a connection to a lighting device. Furthermore, this lighting device is used to display to the user his current listening volume. This can be displayed in a central part and expressed by the luminous intensity or size of a cone of light.

In particular, the central part of the selecting element may thus be at least partly in optically and/or visually transparent form, specifically in connection with the central part as inner part and with an outer part in the shape described above, in particular in the hollow cylindrical shape or in the annular shape.

The selection controller configured according to the present subject matter can be used to address different aspects of an underlying audio control device by way of the selecting element.

As such, in another advantageous example embodiment of the selection controller according to the present subject matter, it is possible for the selecting element to be designed to select a volume, a balance, a tone, a filter and/or an operating mode.

According to another aspect of the present subject matter, an audio control device—for the interior of a vehicle—as such is also provided, which has a selection controller configured according to the present subject matter for the purpose of manual selection of at least one type of operation and/or operating property.

In addition, the present subject matter also provides a vehicle as such, which may in particular also be configured as a general means of transport or specifically as a motor vehicle or as a passenger vehicle, an audio control device produced according to the present subject matter being provided for and produced in the respective interior.

Further details, features and advantages of the present subject matter will emerge from the description that follows and from the figures.

DETAILED DESCRIPTION OF THE DRAWINGS

Example embodiments and the technical background of the present subject matter are described in detail below with reference to the Figures. Identical and equivalent and also identically or equivalently acting elements and components are denoted by the same reference signs. The detailed description of the denoted elements and components is not reproduced every time they occur.

The depicted features and further properties can be isolated from one another in any form and combined with one another in any way without departing from the essence of the present subject matter.

Figure 1:
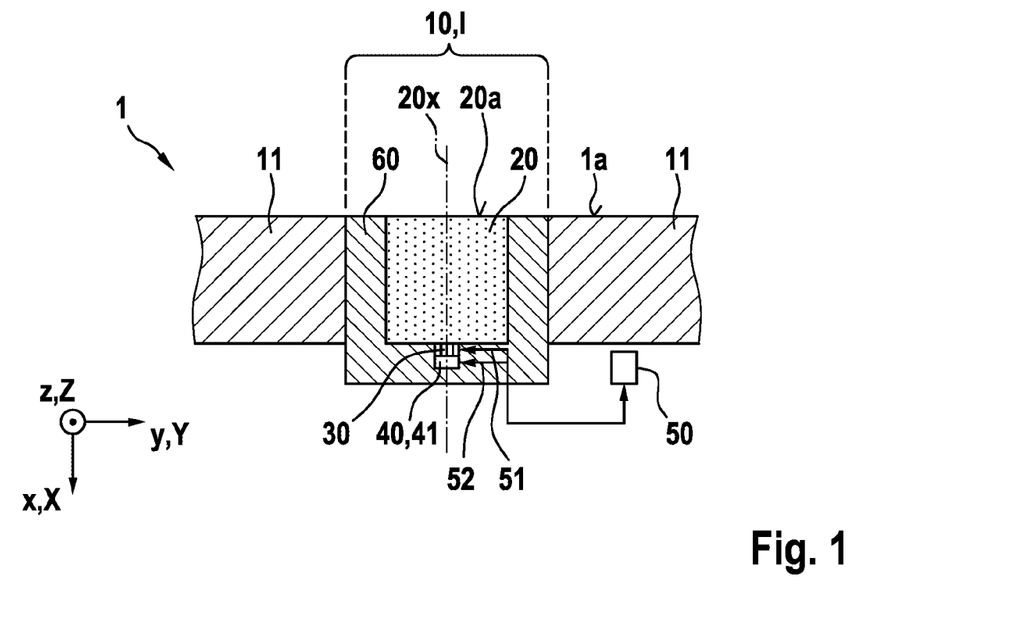
FIG. 1 shows a schematic and sectional side view of an embodiment of the selection controller according to the present subject matter in connection with an audio control device configured in two operating states of the respectively produced selecting element.
Figure 2:
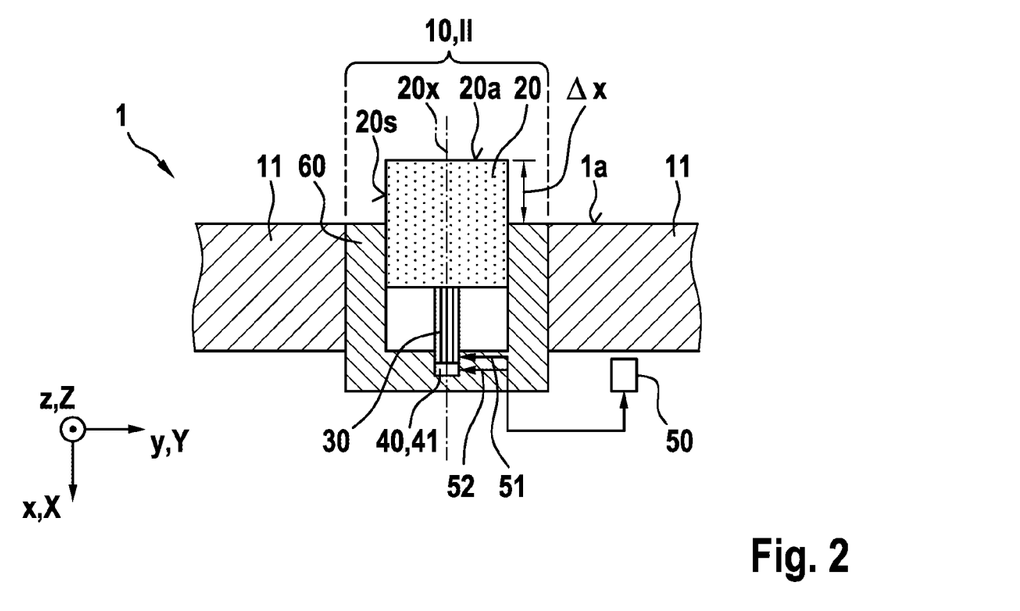
FIG. 2 shows a schematic and sectional side view of an embodiment of the selection controller according to the present subject matter in connection with an audio control device configured in two operating states of the respectively produced selecting element.

FIGS. 1 and 2 show a schematic and sectional side view of an embodiment of the selection controller 10 according to the present subject matter in connection with an audio control device 1 configured according to the present subject matter, specifically in two operating states I and II of the respectively produced selecting element 20.

In the depiction shown in FIGS. 1 and 2, the sectional plane lies parallel to the x-y plane of the tripod xyz indicated in the figures. The x direction is parallel to the direction of vehicle longitudinal extent X and the y direction is oriented parallel to the direction of vehicle transverse extent Y. The z direction is aligned parallel to the direction of vertical extent Z of the underlying vehicle.

The audio control device 1 shown in FIGS. 1 and 2 is represented schematically there by the body 5. This has a front surface or control surface 1a facing the interior, not depicted in detail here, of the underlying vehicle, said front surface or control surface being able to be of substantially planar configuration at least locally or generally.

The body 5 of the audio control device 1 has a selection controller 10, which is configured according to the present subject matter, produced in it in an integrated manner, the selecting element 20 together with the housing 60 being flush and thus not raised in regard to the control surface 1a in state I depicted in FIG. 1.

In other words, this means that the front surface 20a of the selecting element 20 terminates flush or substantially flush with the control surface 1a of the audio control device 1, at least locally.

In a preferred configuration of the selection controller 10 according to the present subject matter from FIGS. 1 and 2, state I depicted in FIG. 1 may correspond to and be associated with an inactive or unactivated state of the selecting element 20, in which operating the selecting element 20 does not lead to a selection or an adjustment on the audio control device 1. This is not imperative, however.

In state II depicted in FIG. 2, the selecting element 20 rises above the control surface 1a of the audio control device 1 in such a way that the front surface 20a of the selecting element 20 is at a distance from the control surface 1a by an amount $\Delta x$ against the x direction. This allows the operator to better feel for the selecting element 20 and grasp it at the lateral surfaces 20s for a control action, without needing to visually register the selecting element 20.

In order to achieve a transition from state I from FIG. 1 to state II from FIG. 2 for the selecting element 20, a moving device 30 having a drive or motor 31 (see FIGS. 3 to 9), which is not depicted here and which can be used to shift the selecting element 20 along the x direction in the housing 60 in a controlled manner, is produced on the rear and thus remotely from the control surface 1a of the audio control device 1.

In order to bring about a controlled shift or movement of this kind between states I and II for the selecting element 20, the moving device 30 is operatively connected to an electronic control unit 50 by way of a detection and/or control line 51.

A further detection and/or control line 52 provides an operative connection between the electronic control unit 50 and a sensor 40 having a proximity sensor 41, said sensor 40 being in finished form in relation to control surface 1a.

This allows for example the approach of the hand of an operator or user in the region of the front surface 20a of the selecting element 20 to be detected, whereupon the moving device 30 is controlled by means of the drive 31 in such a way as to move the selecting element 20 from state I to state II and therefore against the hand of the potential user or operator.

Following operation and/or after the hand of the operator or user has been removed, this can likewise be detected in operative connection between the sensor 40 and the electronic control unit 50, whereupon the moving device 30 is actuated again in order to move the selecting element 20 from the extended state II, considered to be the second state for the purposes of the present subject matter, to the retracted state I, considered to be the first state for the purposes of the present subject matter.

As already mentioned above, precisely arranged guide grooves 36 allow segments and segment bodies 22, 23 to be driven from position I to position II, and vice versa, in a specific displacement rhythm. Furthermore, this achieves decoupling that enables the selection controller 10 to be used. This displacement rhythm can enable the audio control device to be used quickly and intuitively, so as to allow no obstructions to arise for the user in the course of this. The underlying motor can achieve a precise speed, in order to ensure that the segments 22 are shifted in a specific period of time.

FIGS. 3 to 9 show a schematic, partly sectional and/or perspective view of another embodiment of the selection controller 10 according to the present subject matter in various operating states for the selecting element 20 provided there and its components.

FIGS. 3 to 7 show the moving apparatus. The segments and segment bodies 22, 23 are taken from position I to position II, and vice versa, by a particular arrangement of the guide groove 36 in the moving device 30. The housing 60 remains at rest and can ensure a link to the vehicle interior.

In addition and/or as an alternative to the elements depicted in FIGS. 1 and 2 for the embodiment there, the selecting element 20 of this embodiment is of multipiece construction, specifically with a central part 25 that is constructed in the center and axially symmetrically with respect to the axis of symmetry 20x of the selecting element 20 and that may at least partly be of optically and/or visually transparent configuration, in order to be illuminated and have light shone through it in retrograde fashion by means of a lighting device.

Furthermore, the multipiece selecting element 20 has an outer part 21 having a plurality of segments 22. The segments 22 as a whole form an annular shape in section and, spatially, the structure of a hollow cylinder or enveloping body. The selecting element 20 has its central part 25 and its outer part 21 enclosed inside the housing 60.

The individual segments 22 are formed by a segment body 23, a guide rod 24 attached to an underside of the segment body 23, which can also be referred to as a control rod, and a sliding pin 26, which is attached to an outer side of the respective guide rod 24.

The segments 22 of the outer part 21 of the selecting element 20 are enclosed by a slide sleeve 34 in the region of the guide rods 24 in such a way that the sliding pins 26 are picked up in corresponding guide grooves 36.

A drive 31 or motor of the moving device 30 is used to rotate the slide sleeve 34 about the axis of symmetry 20x acting as an axis of rotation by way of a coupling by means of a gear 32 having gear components 32-1 and 32-2.

This rotation of the slide sleeve 34 about the axis of symmetry 20x shifts the sliding pins 26 in the guide grooves 36 on the basis of the interaction of the sliding pins 26 and the guide grooves 36, so that all in all the guide rods 24 together with the segment bodies 23, and therefore the individual segments 22 of the outer part 21, are able to be shifted in the x direction or against the x direction in a controllable manner.

Figure 3:
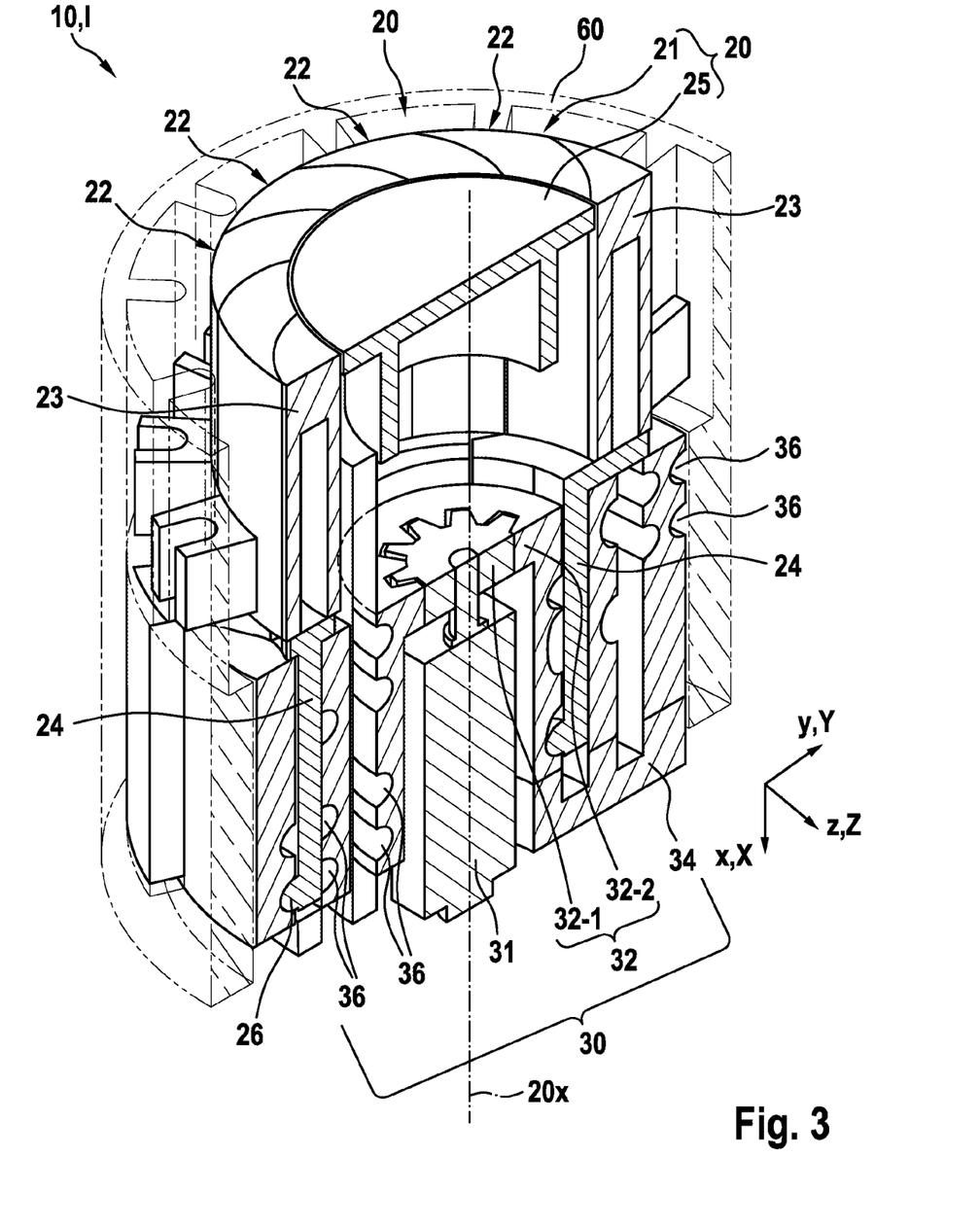
FIG. 3 shows a schematic, partly sectional and/or perspective view of another embodiment of the selection controller according to the present subject matter in various operating states for the selecting element provided there and the components thereof.
Figure 4:
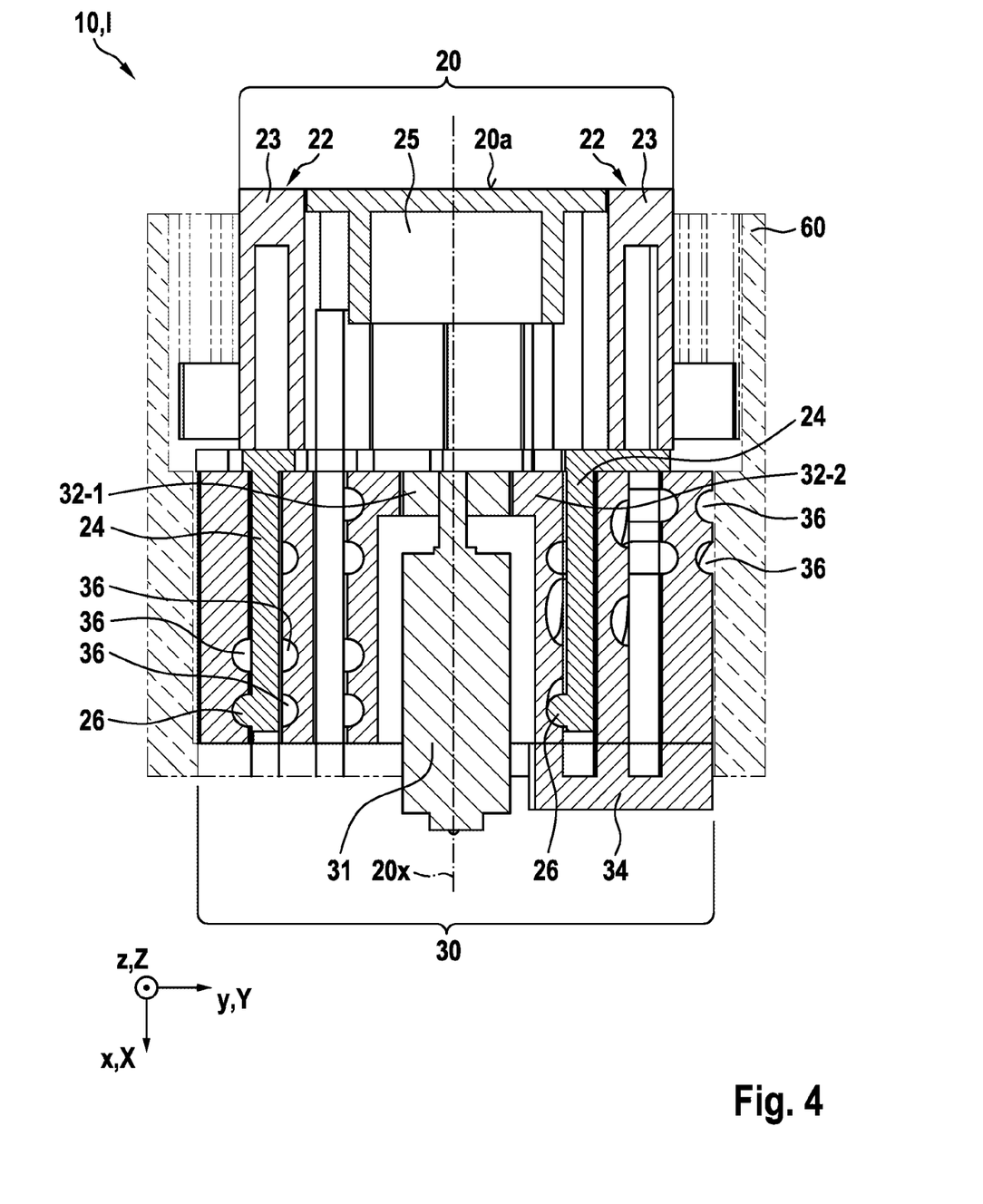
FIG. 4 shows a schematic, partly sectional view of another embodiment of the selection controller according to the present subject matter in various operating states for the selecting element provided there and the components thereof.
Figure 5:
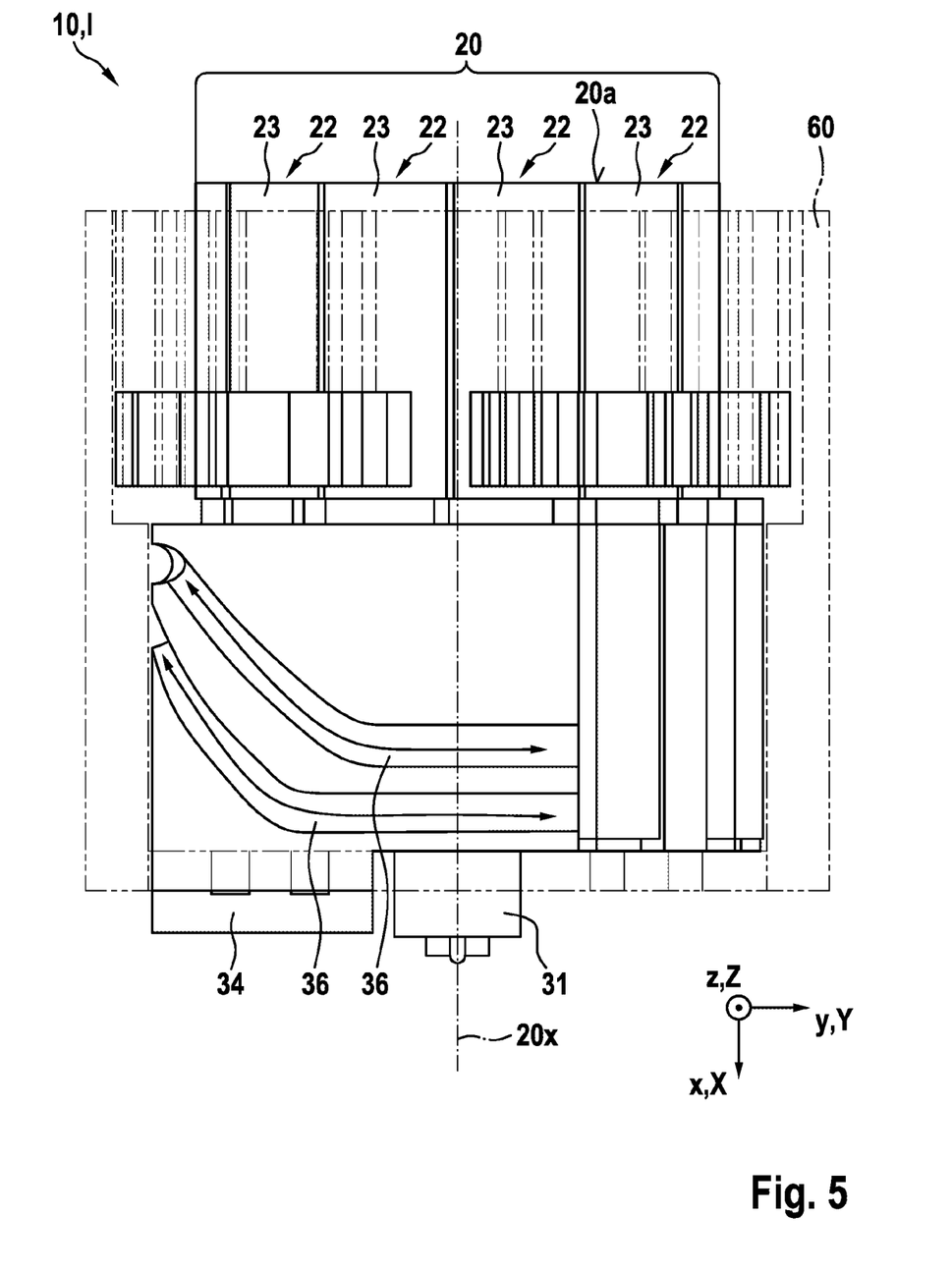
FIG. 5 shows a schematic, partly sectional and/or perspective view of another embodiment of the selection controller according to the present subject matter in various operating states for the selecting element provided there and the components thereof.
Figure 6:
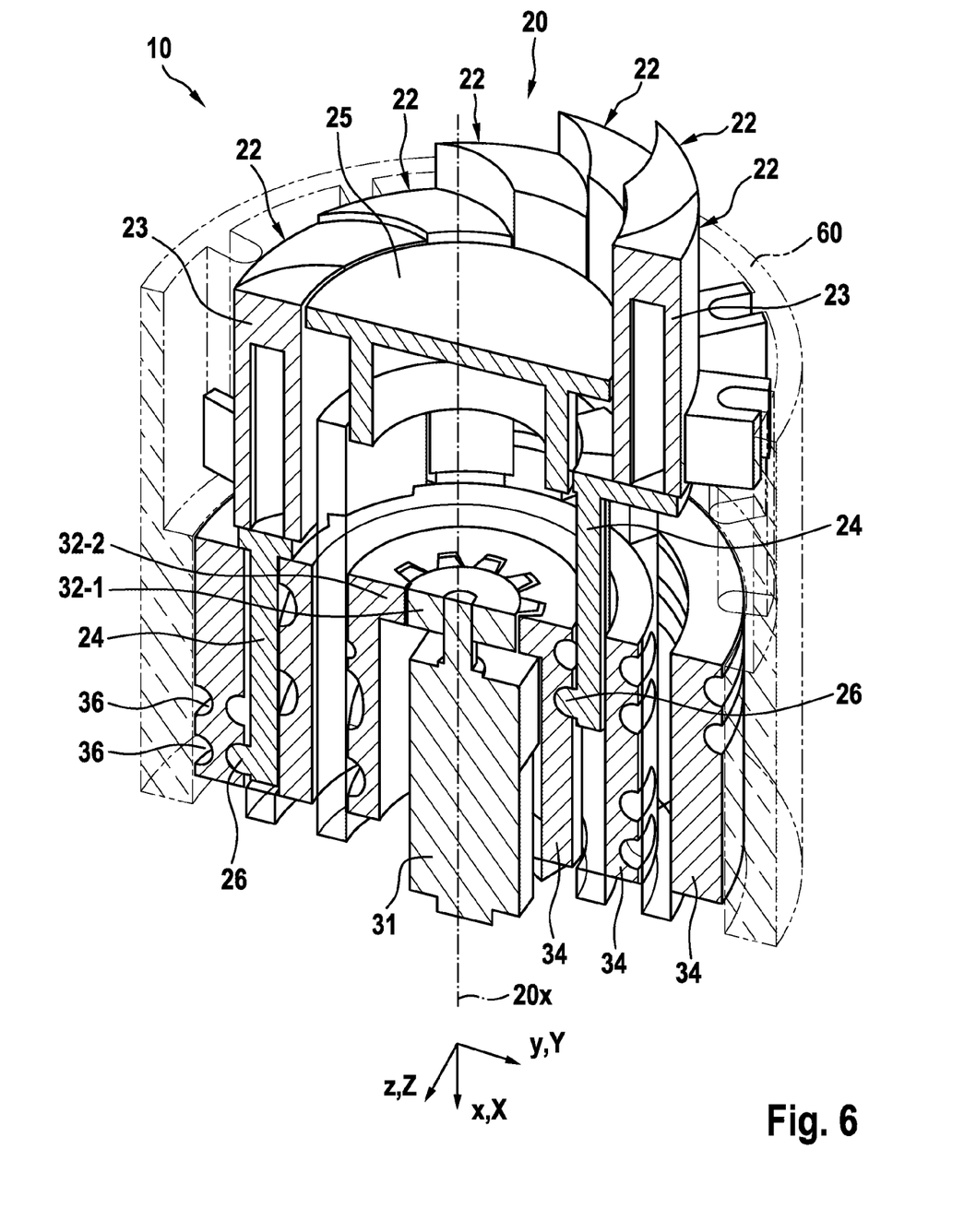
FIG. 6 shows a schematic, partly sectional view of another embodiment of the selection controller according to the present subject matter in various operating states for the selecting element provided there and the components thereof.
Figure 7:
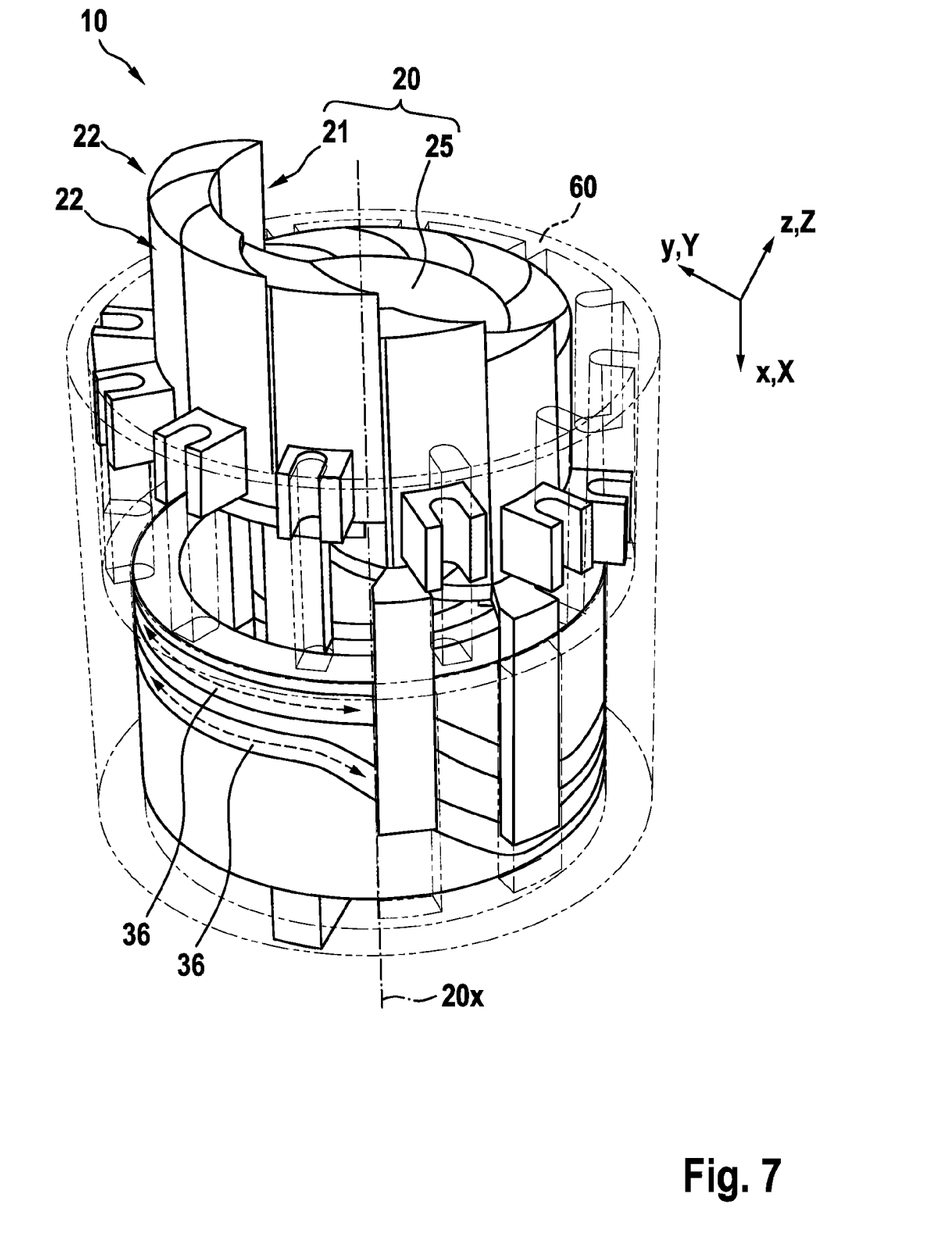
FIG. 7 shows a schematic, partly sectional and/or perspective view of another embodiment of the selection controller according to the present subject matter in various operating states for the selecting element provided there and the components thereof.
Figure 8:
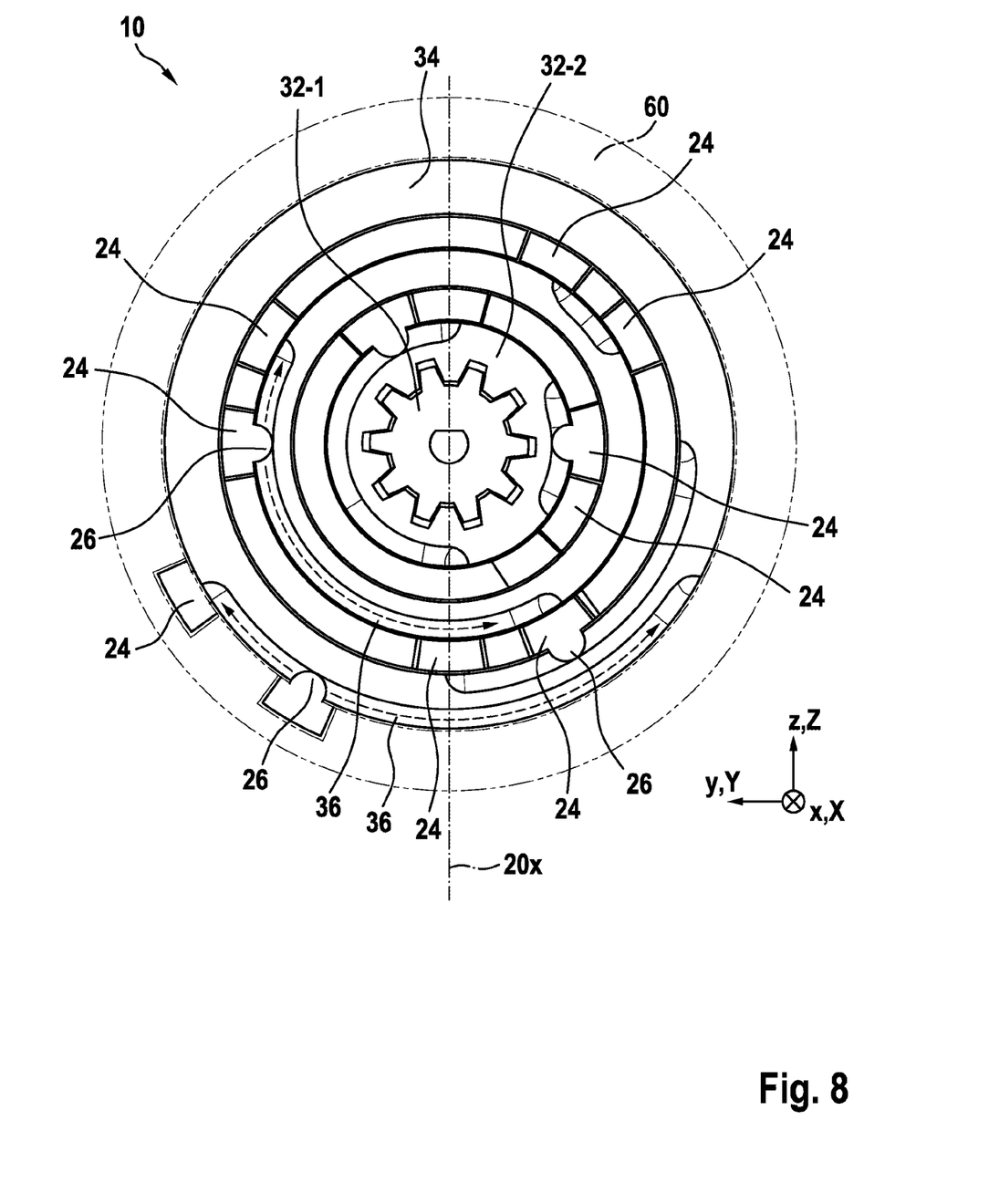
FIG. 8 shows a schematic, partly sectional and/or perspective view of another embodiment of the selection controller according to the present subject matter in various operating states for the selecting element provided there and the components thereof.
Figure 9:
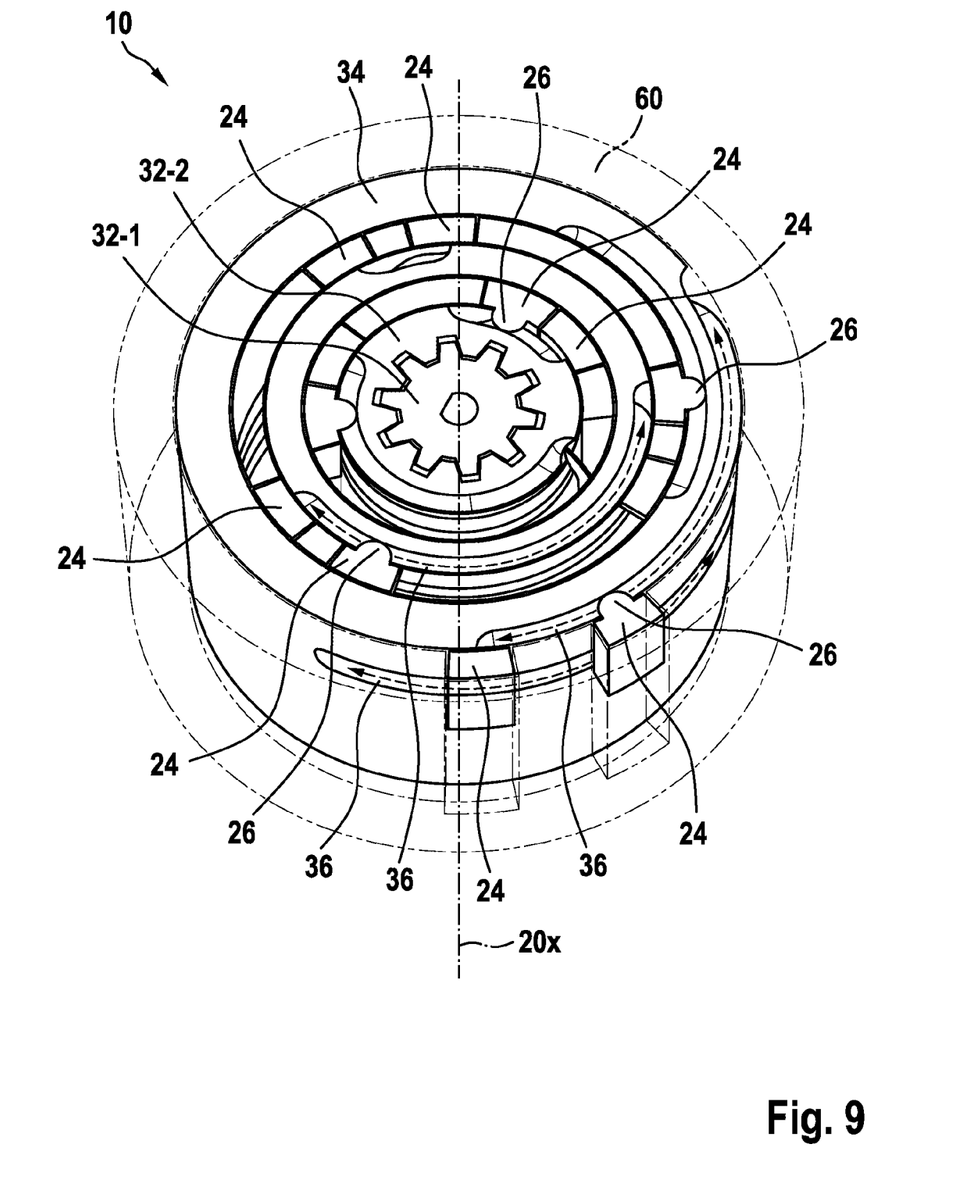
FIG. 9 shows a schematic, partly sectional view of another embodiment of the selection controller according to the present subject matter in various operating states for the selecting element provided there and the components thereof.

This allows the outer part 21 to be extended and retracted in segments or altogether as the segments 22 as a whole between position I, which is depicted in FIG. 3 and not raised, and any intermediate positions through to the completely extended position II, as depicted in FIGS. 3 to 9.

The accompanying figures also show by and large that the present subject matter provides a selection controller 10 for manual selection of a type of audio operation for an audio control device 1—in particular in the style of a movably retractable and extendable volume control—, in particular for a or the or in a or the interior of a vehicle, specifically having a selecting element 20 that is designed for manual operation for the selection of the type of audio operation and so as to be able to be arranged at least in a first position I, which is not raised from and/or is flush with a control surface 1a of the underlying audio control device 1, and in a second position II, which is raised from the control surface 1a and/or projects into the interior, and/or to be able to be mechanically movable between positions I and II, in particular in a respectively controllable manner.

LIST OF REFERENCE SIGNS 1 audio control device
1a control surface
10 selection controller
11 body, main part
20 selecting element
20a front surface, surface
20x axis of symmetry of the selecting element 20, axis of rotation of the drive 31
21 outer part, ring
22 segment
23 segment body
24 guide rod, control rod
25 central part, inner part
26 sliding pin
30 moving device
31 drive, motor
32 gear
32-1 gear component
32-2 gear component
34 slide sleeve
36 guide groove
40 sensor
41 proximity sensor
50 electronic control unit
51 detection and/or control line
52 detection and/or control line
60 housing
x spatial direction
X direction of vehicle longitudinal extent
y spatial direction
Y direction of vehicle transverse extent
z spatial direction
Z vertical direction
Δx shift

What is claimed is:

1. A selection controller for manual selection of at least one type of operation and/or operating property of an audio control device in an interior of a vehicle comprising:
   a selecting element comprising a plurality of segments and configured to allow a user to make the manual selection, wherein
      the selecting element is configured to be arranged in:
         a first position, which is not raised from a control surface of the audio control device, and
         a second position, which is raised from the control surface of the audio control device;
   a moving device or a connection to a moving device, wherein
      the moving device is configured to rotate and cause the selecting element to shift from the first position to the second position and/or from the second position to the first position in each case automatically, selectively and/or in a controllable manner; and
   a sliding pin configured to be shifted in a guide groove by the moving device to extend one or more of the segments from the control surface and/or retract one or more of the segments to the control surface.

2. The selection controller according to claim 1, wherein
   the first position of the selecting element is associated with a first operating state, and/or an operating state that is inactive for selection using the selecting element, and/or
   the second position of the selecting element is associated with a second operating state, and/or an operating state that is active for selection using the selecting element.

3. The selection controller according to claim 1, further comprising:
   an electronic control unit or a connection to an electronic control unit, wherein
      the electronic control unit is configured to perform, initiate, control and/or regulate:
         an arrangement or the arranging of the selecting element in the first position,
         in the second position, movement from the first position to the second position and/or movement from the second position to the first position, and/or
         operation of a moving device.

4. The selection controller according to claim 1, further comprising:
   a sensor or a connection to a sensor, wherein
      the sensor is configured to:
         detect a hand gesture and/or approach by the user in regard to the audio control device and/or the selecting element, and
         signal to an electronic control unit, and
      the selection controller is configured to:
         put the selecting element into the second position, or
         at least temporarily keep the selecting element in the second position in the event of an approach and/or in the event of a predefined gesture.

5. The selection controller according to claim 1, wherein the selecting element is:
   wholly or partly in segmented form in an outer part of the selecting element having a plurality of segments that share a same outer edge radius and are:
      individually,
      simultaneously,
      successively, and/or
      coordinately movable between the first and second positions.

6. The selection controller according to claim 1, wherein the selecting element is further configured to:
   select a volume, a balance, a tone, a type of operation, an operating mode, a function, a filter, an audio source, a data source, an output channel; and/or
   generate and/or provide a signal that is representative of a selection.

7. An audio control device for the interior of a vehicle comprising:
   a selection controller according to claim 1 to manually select at least one type of operation and/or operating property.

8. A passenger vehicle comprising:
   the audio control device of claim 7 disposed within the interior of the passenger vehicle.

9. The selection controller according to claim 1, wherein the selecting element forms:
   a hollow cylindrical shape or,
   in cross section, an annular shape.

10. The selection controller of claim 1, further comprising:
a slide sleeve configured to be rotated by a gear coupled to the moving device.

11. A selection controller for manual selection of at least one type of operation and/or operating property of an audio control device in an interior of a vehicle comprising:
a selecting element comprising a plurality of segments and configured to allow a user to make the manual selection, wherein
the segments of the selecting element are configured to be shifted based on a rotation of a moving device to:
a first position, which is not raised from a control surface of the audio control device, and
a second position, which is raised from the control surface of the audio control device; and
a slide sleeve enclosing the plurality of segments and configured to be rotated by the moving device.

12. The selection controller of claim 11, wherein each of the segments further comprise:
a sliding pin configured to be shifted in a guide groove by the moving device to extend the segments from the control surface and/or retract the segments to the control surface.

13. The selection controller of claim 11, wherein each of the segments further comprise:
a sliding pin configured to be shifted in a guide groove that configures each of the segments to be displaced axially with respect to the selecting element when rotated by the moving device.

14. The selection controller of claim 13, wherein
the guide groove further configures each of the segments to be displaced axially at a different extended distance from the control surface.

15. The selection controller of claim 13, wherein
the guide groove further configures each of the segments to be displaced axially at a same extended distance from the control surface.

16. The selection controller of claim 11, wherein the slide sleeve comprises:
a guide groove configured to pick up a sliding pin corresponding to each of the plurality of segments.

17. The selection controller of claim 11, wherein
the plurality of segments share a same outer edge radius.

* * * * *